US006956848B1

(12) United States Patent
Keung et al.

(10) Patent No.: US 6,956,848 B1
(45) Date of Patent: Oct. 18, 2005

(54) COMPUTER NETWORK-BASED AUTO-ATTENDANT METHOD AND APPARATUS

(75) Inventors: Donggun Keung, Milpitas, CA (US); Yi Zhang, San Jose, CA (US); Shirley Sun, Saratoga, CA (US); Gilbert Hu, Fremont, CA (US)

(73) Assignee: AltiGen Communications, Inc., Fremont, CA (US)

( * ) Notice: Subject to any disclaimer, the term of this patent is extended or adjusted under 35 U.S.C. 154(b) by 596 days.

(21) Appl. No.: 09/593,821

(22) Filed: Jun. 13, 2000

Related U.S. Application Data

(60) Provisional application No. 60/158,987, filed on Oct. 12, 1999, and provisional application No. 60/139,342, filed on Jun. 15, 1999.

(51) Int. Cl.$^{7}$ .................................................. H04L 12/66

(52) U.S. Cl. ......................... 370/356; 370/352; 370/354

(58) Field of Search ............................ 370/356, 395.52, 370/395.54, 352, 354; 379/210

(56) References Cited

U.S. PATENT DOCUMENTS 6,154,465 A * 11/2000 Pickett ........................ 370/466
6,289,025 B1 * 9/2001 Pang et al. ................. 370/458
6,496,500 B2 * 12/2002 Nance et al. ............... 370/352

* cited by examiner

*Primary Examiner*—Wellington Chin
*Assistant Examiner*—Mark A Mais
(74) *Attorney, Agent, or Firm*—Townsend and Townsend and Crew LLP

(57) ABSTRACT

According to an embodiment of the present invention, a method for operating a telecommunications system includes a telephone call from an external telephone line, determining a computer network address and switching data in response to the telephone call, coupling the telecommunications system with a remote telecommunications system at the computer network address, transmitting switching data from the telecommunications system to the remote telecommunications system via the Internet, coupling the telephone call to an auto attendant at the remote telecommunications system in response to the switching data.

18 Claims, 10 Drawing Sheets

COMPUTER NETWORK-BASED AUTO-ATTENDANT METHOD AND APPARATUS

CROSS-REFERENCE TO RELATED APPLICATIONS

The present invention disclosure claims priority to U.S. patent application Ser. No. 60/158,987, filed Oct. 12, 1999, and U.S. patent application Ser. No. 60/139,342, filed Jun. 15, 1999. These applications are herein incorporated by reference for all purposes. Additionally, U.S. Pat. No. 6,532,230 issued on Mar. 11, 2003, is also incorporated by reference for all purposes.

BACKGROUND OF THE INVENTION

The present invention relates to telecommunications. More specifically, the present invention relates to telephone and telecommunications systems and servers for communication across computer networks.

the prospect of consumers making a long distance call for the price of a local call has spawned the market for Internet-based telephony. There are two current techniques enabling consumers to make calls over the Internet.

One technique for internet-based telephony requires both the sending individual and the receiving individual to both have computers that are connected to the internet, and require the receiver to have a known internet address. Typically the sender types-in the receiver's known internet address, connects the receivers computer across the internet, and when connection is made, talks to the receiver.

This technique has several draw-backs, for example, individual users typically do not have their own unique internet address. Since individual users typically connect to the internet through an internet service provider (ISP), only when the user connects, will she have a dynamically assigned internet address. Thus, in order for another individual to contact here, she must somehow transmit the dynamically assigned internet address to the calling party and then await being contacted. With this technique the call must be pre-arranged, and is limited to person to person calls. Another drawback is that the sender and the receiver must use multimedia computers, i.e. computers equipped with speakers and microphones.

Another technique for internet-based telephony again requires both parties to have multi-media computers that are connected to the Internet. Initially, both parties connect to a particular host site. This host site then provides both parties with a list of users coupled to that site, such as conventional chat room. One party then selects the other party's name from the list of names and then makes the connection.

This technique has several draw-backs including that the users must rely on a third party host site in order to make contact with each other. Another drawback is that since both parties must actively contact the site before talking to each other, the call must be pre-arranged.

Thus, in light of the above, what is needed in the industry are new and improved methods and apparatus for providing internet-based telephony.

SUMMARY OF THE INVENTION

The present invention relates to methods and apparatus for communications across a computer network. In particular, the present invention relates to novel methods and apparatus for providing telecommunications via wide area computer networks.

According to an embodiment of the present invention, a method for operating a telecommunications system includes receiving a telephone call from an external telephone line, determining a computer network address and switching data in response to the telephone call, coupling the telecommunications system with a remote telecommunications system at the computer network address, and transmitting switching data from the telecommunications system to the remote telecommunications system via the Internet. The technique may also include coupling the telephone call to an auto attendant at the remote telecommunications system in response to the switching data.

According to another embodiment of the present invention, a method for operating a telecommunications system includes receiving a telephone call from an external telephone line into the telecommunications system, coupling the external telephone line to an auto-attendant at the telecommunications system, and outputting a menu selection message to the external telephone line. The method may also include receiving input data from the external telephone line for the auto attendant via a wide area network, in response to the menu selection message, determining a computer network address and switching data in response to the input data, and coupling the telecommunications system with a remote telecommunications system at the computer network address. Transmitting switching data from the telecommunications system to the remote telecommunications system, and coupling the telephone call to a telephone coupled the remote telecommunications system in response to the switching data may also be performed.

According to yet another embodiment of the present invention, a method for operating a telecommunications system may include receiving a telephone call from a telephone extension coupled to the telecommunications system, and determining a computer network address identifier and connection data in response to the telephone call. The method may also include coupling the telecommunications system with a remote telecommunications system in response to the computer network address identifier, and transmitting connecting data from the telecommunications system to the remote telecommunications system via a computer network. The method may also include coupling the telephone call to an auto attendant at the remote telecommunications system in response to the connection data.

Other embodiments include telecommunications system operated as described below. Further, still other embodiments include computer program products stored on tangible media that direct the telecommunications system to operate as described below.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which.

DESCRIPTION OF SPECIFIC EMBODIMENTS

Figure 1:
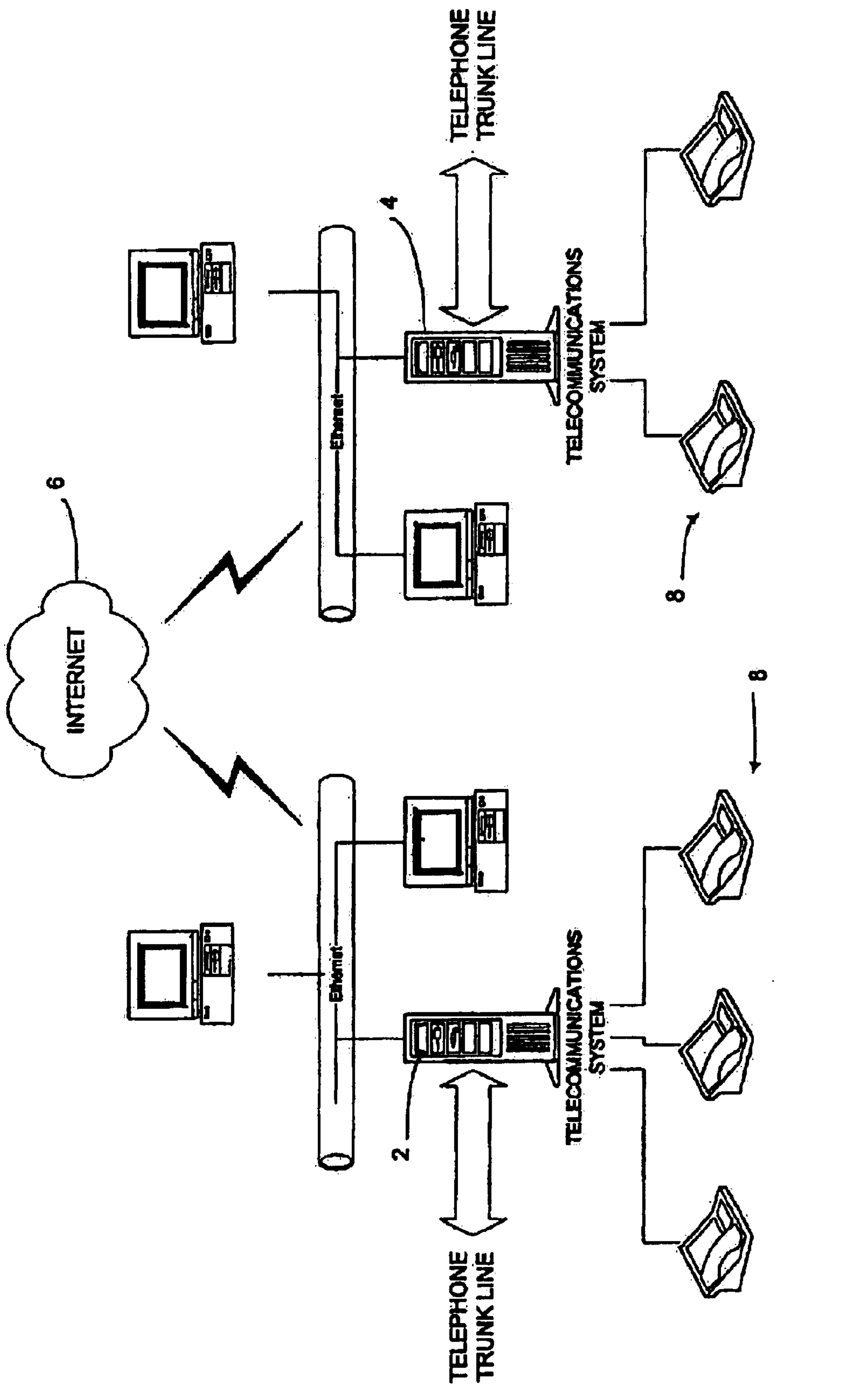
FIG. 1 is an overview block diagram of an embodiment of the present invention.

FIG. 1 is an overview block diagram of an embodiment of the present invention. FIG. 1 illustrates a telecommunications system 2 and a telecommunications system 4, coupled via a network 6.

Each telecommunications system typically provides conventional telephone service to a plurality of respective telephones 8. Further, each telecommunications system also provides telephone service across a computer network, for example wide area networks including the Internet, internal intranets, and the like. Further description of these capabilities will be given below. Further disclosure can be found in: U.S. Pat. No. 6,532,230, entitled Mixed-Media Communication Apparatus and Method, issued Mar. 11, 2003, and assigned to the present assignee. This patent is herein incorporated by reference for all purposes.

In the present embodiment, a caller coupled to telecommunications system 2 typically picks-up the telephone handset, and dials a desired telephone number. When the telephone number is an internal extension, telecommunications system 2 couples the call to the other extension; and when the telephone number is an outside telephone number, telecommunications system 2 typically couples the call to the telephone trunk line.

When the user dials specific telephone numbers, telecommunications system 2 may determine that the most efficient method for making the telephone call is through network 6. In response, telecommunications system 2 formats the telephone call request, and sends the data to telecommunications system 4. When telecommunications system 4 receives the telephone call request, telecommunications system 4 determines the telephone number, and then rings that telephone. The telephone call may be for an internal extension or for an outside telephone. When the telephone is answered, the caller and the receiver can then communicate.

In the present embodiment, as the caller or the receiver communicate, the analog data, typically their voices, are digitized and fragmented into packets of data by the respective telecommunications systems. These packets of data are then passed to the other telecommunications system via computer network 6. The other telecommunications system re-assembles the data packets and converts them back into analog form.

When making a network telephone call, telecommunications systems typically use a combination of network protocols to help ensure the arrival of data across the network. For example, in the present embodiment, transmission control protocol (TCP) is used. In alternative embodiments of the present invention, other control protocols, and other combinations of control protocols may be used, for example: TCP, IP, UDP and the like.

Figure 2:
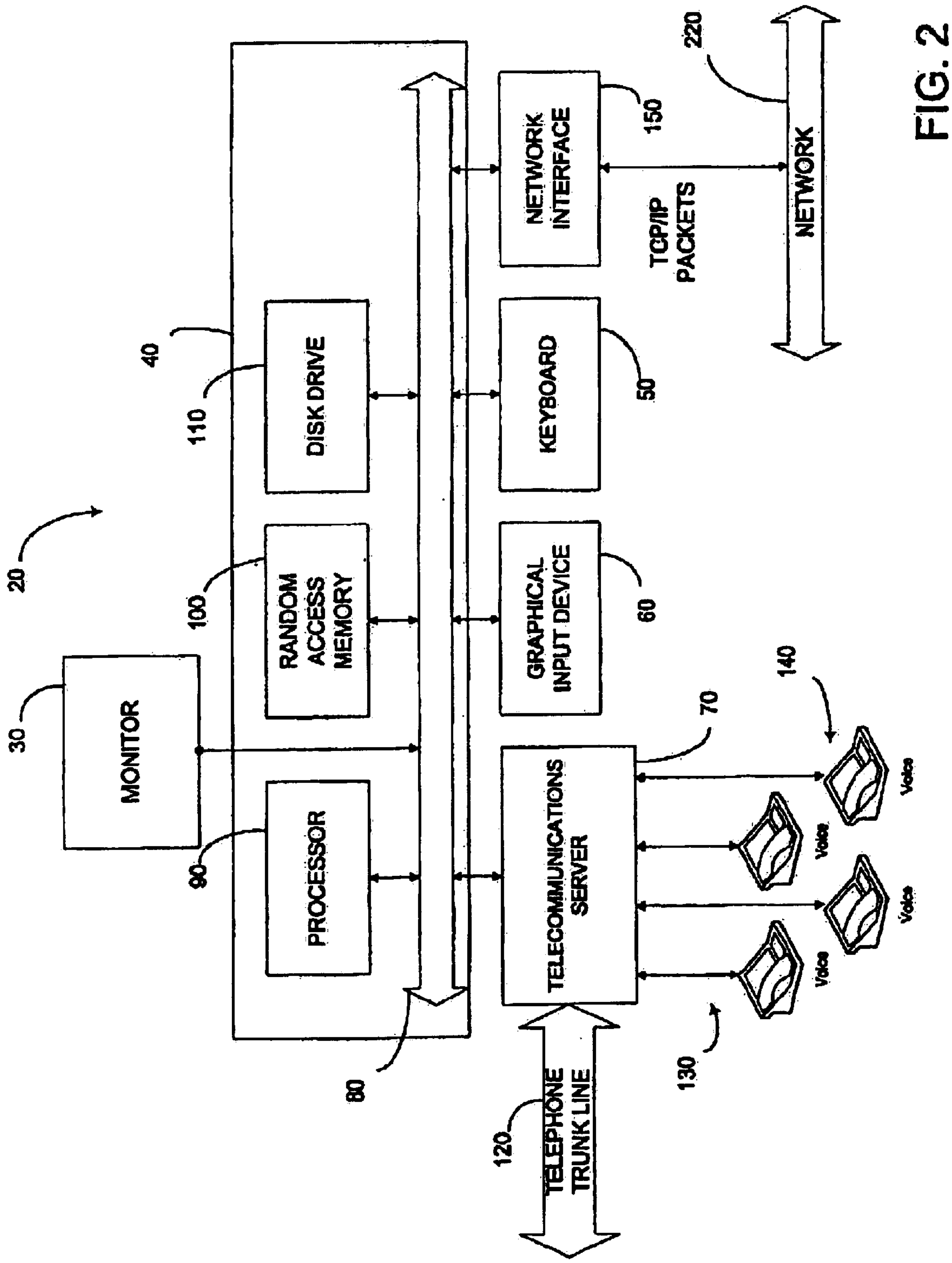
FIG. 2 is a block diagram of an embodiment of the present invention.

FIG. 2 is a block diagram of a telecommunications system 20 according to a preferred embodiment of the present invention. Telecommunications system 20 includes a monitor 30, a computer 40, a keyboard 50, an input device 60, and a telecommunications sever 70. Computer 40 includes familiar computer components such as a processor 90, and memory storage devices, such as a random access memory (RAM) 100, a disk drive 110, and a system bus 80 interconnecting the above components. A telephone trunk line 120 and individual telephone lines 130 are coupled to telecommunications server 70. Handsets 140, (also telephones or telephone handsets) may be coupled to individual telephone lines 130.

Handsets 140 are preferably analog signal telephone handsets, however alternatively they may be any well known type of digital or analog telephone handset. A mouse is but one example of an input device 60, also known as a pointing device. Other types of input devices may include trackballs, drawing tablets, microphones (for voice activated input), and the like. Telecommunications system 20 may be coupled to a computer network 150 through use of a network interface 160 such as an Ethernet card, a modem, and the like.

RAM 100 and disk drive 110 are examples of tangible media for storage of data, message files, computer programs, drivers for the telecommunications server, embodiments of the herein described methods, and the like. Other types of tangible media include floppy disks, removable hard disks, optical storage media such as CD-ROMS and bar codes, and semiconductor memories such as flash memories, read-only-memories (ROMS), and battery-backed volatile memories.

In a preferred embodiment, telecommunications system 20 includes a PC compatible computer having '586 or '686 class based microprocessors, such as the Athlon™ microprocessor from AMD. Further, in the present embodiment, telecommunications system 20 utilizes the WindowsNT™ operating from Microsoft Corporation, and runs AltiWare™ IP and AltiWareOE software form AltiGen Communications, Inc. Telecommunications server 70 are preferably embodied as a Triton DSP PCI based and at least one Quantum telephony ISA based plug-in expansion boards from AltiGen Communications, Inc. These boards are also coupled to a dedicated data bus, such as the MVIP bus, or the like.

FIG. 2 is representative of but one type of system for embodying the present invention. It will be readily apparent to one of ordinary skill in the art that many system types of hardware and software configurations are suitable for use in conjunction with the present invention. For example, processor such as the G4 from Motorola, PentiumII from Intel, and the like may be used, further any computer communications, bus may be used in alternative embodiments of the present invention. Further telecommunications system 20 may operate under the LINUX operating system, may operate under MAC OS from Apple Computer, BeOS from Be, Incorporated, and the like.

Figure 3:
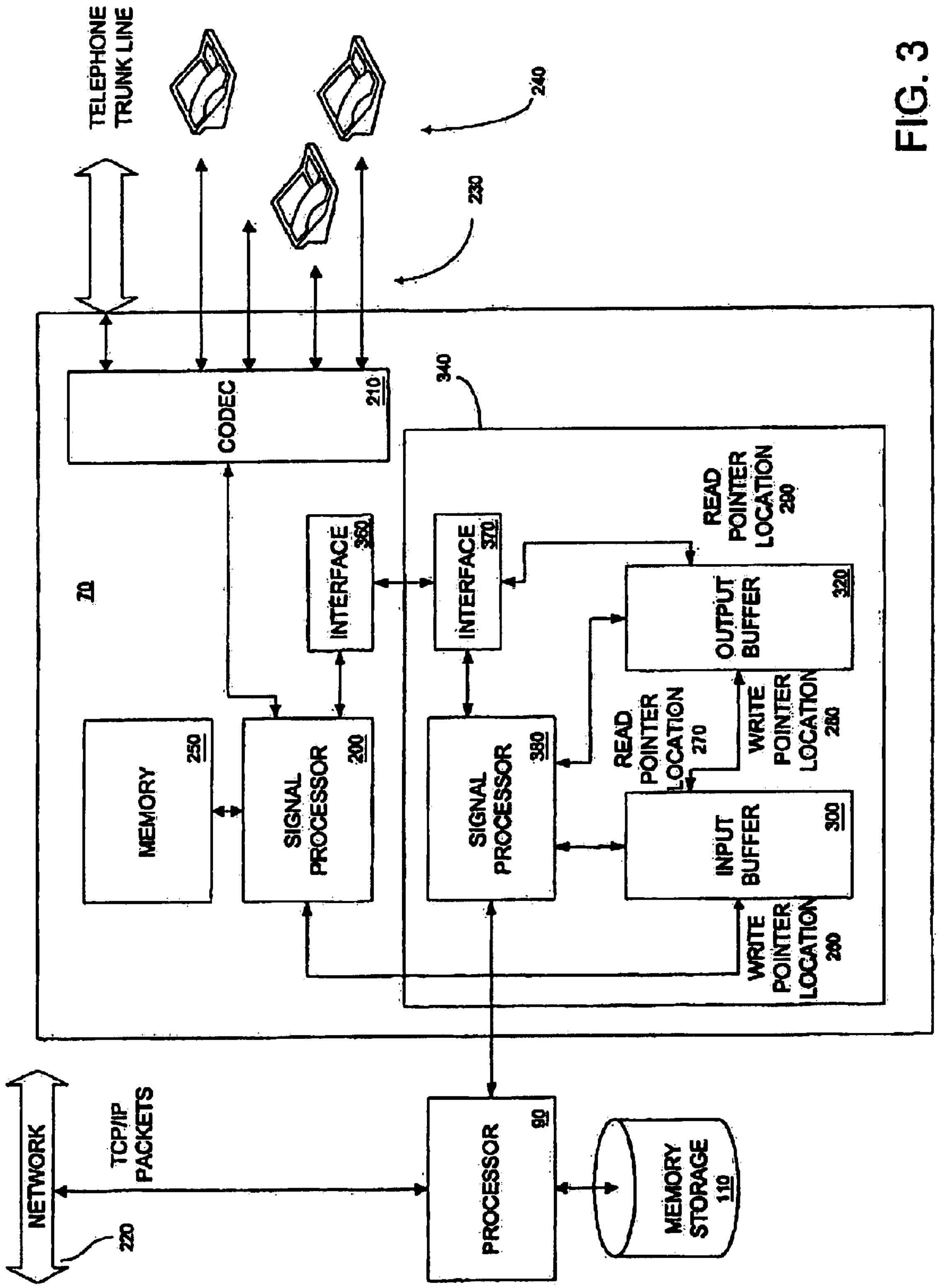
FIG. 3 is a more detailed block diagram of a portion of an embodiment of the present invention.

FIG. 3 is a more detailed diagram of a portion of a telecommunications system according to an embodiment of the present invention. FIG. 3 illustrates processor 90, disk drive 110, and telecommunications server 70. In the present embodiment, telecommunications server 70 includes a signal processor 200, a digital to analog and analog to digital coder (CODEC) 210, and a memory 250. Telecommunications server 70 interfaces with telephone extension lines 230, and in turn, telephone extension lines 230 are coupled to telephone handsets 240. Processor 90 is coupled to a computer network 220, as discussed above.

In FIG. 3, processor 90 is used to control the operation of telecommunications server 70 according to the instructions from the AltiWare software previously described. In one embodiment of the present invention, AltiWare software, operates in a multi-threaded multi-tasking environment, where each thread monitors the status of a particular telephone extension line 230. The status of the particular telephone extension line is typically represented as a state machine in the software.

In the present embodiment, processor 90 is also used to convert incoming audio message to message files in a predefined storage format, and to convert message files and voice prompt files from predefined storage formats to an output format (typically digital signals). In the present embodiment, two specific storage format can be used for audio messages including the well-known ".wav" file format, and a pulse coded modulation scheme (PCM). The voice data is typically stored and played-back in a streaming manner.

In other embodiments of the present invention, a single storage format may be used. In other embodiments, other formats for storage of audio messages and the like are known to those of ordinary skill in the art and can be used. For example, formats such as the "RealAudio" format, from Real Networks, Inc., Motion Picture Experts Group Payer 3, MP3, G.723.1 and the like may be also be used in embodiments of the present invention.

In the present embodiment, memory storage 110 is used to store audio messages, such as voice messages, numeric telephone numbers, caller databases, voice prompt files, computer network addresses: for example IP addresses, domain names, available ports; embodiments of the present invention, e-mail addresses, data and the like.

In this embodiment, processor 90 is also used to maintain a list of telephone numbers and a mapping of these telephone numbers. In particular, processor 90 maintains a list of physical telephone extensions 230 and "virtual" telephone numbers, i.e. telephone numbers that are accessed across computer network 220. As will be described further below, when a telephone call is received, processor 90 determines whether the telephone call is a physical telephone extension or a virtual telephone number.

In the case the telephone call is for a physical telephone extension, in this example, processor 90 connects the telephone call to the appropriate telephone extension 230. In the case the telephone call is for a virtual telephone number, processor 90 initially determines a remote telecommunications system is associated with the virtual telephone number. In another embodiment, signal processor 200 maintains the list of telephone numbers and performs the mapping. In still another embodiment, processor 90 and signal processor 200 work together to maintain the list and perform the mapping.

In the present embodiment, processor 90 is also used to implement auto-attendant functionality. For example, incoming telephone calls may automatically routed to a computer process that may present the caller with a menu of options the caller may select from, and may process the caller's selections. In the present embodiment, types of auto-attendant functions that may be provided include, allowing callers to dial by "name"; to dial extensions, to dial an attendant; to dial voicemail; to hear a directory of personnel, extensions, workgroups and/or departments, and the like. In the present embodiment, the structure of the menus for the auto-attendant is programmed by the administrator of the telecommunications system. Further, functions available from the auto-attendant may be programmable according to time of day, location of the caller, and the like. Other programmable functions may also include setting time-out limits and messages, setting call-back numbers, and the like.

As will be described below, packet portion 340 is used to handle packetized communications between telecommunications system and remote telecommunication server. Similarly, as a remote telecommunications system, packet portion 340 is then used to handle communications between it and telecommunications system.

Signal processor 200 is embodied as a Texas Instruments TMS320C5X digital signal processor (DSPs), and is coupled to receive instructions data, and the like from processor 90. Of course DSPs from other manufacturers may be used in other embodiments of the present invention. Memory 250 is used to store local instructions, voice recognition algorithms, data for signal processor 200, DTMF data, and the like.

In the present embodiment, signal processor 200 also provides telephone switching functionality to each telephone extension line. For example, in this embodiment, signal processor 200 is used to detect off-hook conditions, to provide tone generation, to detect and process key-pad (DTMF) tones generated from each telephone handset 240, to connect incoming telephone calls to appropriate extension, and the like. Other types of switching are contemplated, such as handling incoming and outgoing trunk calls, call transfers to and from IP trunks, call forwarding, message notification, reminder calls, multi-location conferencing, call parking, call waiting, and the like. In some embodiments, signal processor 200 and/or processor 90 are both used to handle automatic call distribution, system call-backs, calling out from voice mail, boomerang, dial last caller, speed dialing, call accounting, CallerID, voice mail, mixed media messaging, MS Exchange integration, client console support, auto-attendant functions, as will be described further below, and the like.

In one embodiment, signal processor 200 is also used to provide messaging functionality, such as an implementation of a voice mail server. In particular, signal processor 200 outputs instructions, user prompts, messages from voice mail boxes, and the like, to the messaging user. Further, signal processor 200 receives function selections in the form of DTMF tones, spoken instructions, spoken messages, and the like from the messaging user. As discussed above, memory storage 110 may be used to store data associated with the messaging functionality, such as voice prompts, the incoming messages, outgoing messages, and the like.

In another embodiment, signal processor 200 is also used to convert or "recognize" particular incoming audio messages and translate the messages into a computer recognizable form. For example, signal processor 200 can recognize the spoken words "three, two, one" as the numeric number "3,2,1", e.g. ASCII character equivalents. As another example, signal processor 200 can recognize the spoken word "yes" or "ok" as an affirmative response, and "no" as a negative response. In some embodiments, signal processor 200 can use any conventional voice recognition algorithms. In embodiments, destined for non-English speaking countries, voice recognition algorithms specific to the native languages may be used.

In an alternative embodiment of the present invention, processor 90 may be used to perform the voice recognition process instead of signal processor 200. In still another embodiment, the voice recognition process may be split between processor 90 and signal processor 200.

Signal processor 200 typically comprises a multi-process environment wherein each process monitors the off-hook and in some embodiments the messaging the status of a particular telephone extension line 230. The status of the particular telephone extension line in off-hook mode is represented as a state machine within signal processor 200. Further, the status of the particular telephone extension line within a voice mail messaging mode is represented as another state machine within signal processor 200. In one embodiment of the present invention, signal processor 200 can process up to twelve telephone extension lines being simultaneously in off-hook mode or in voice mail messaging mode. In alternative embodiments, monitoring of states of a greater or fewer number of telephone extension lines 230 is contemplated.

As is illustrated in FIG. 3, CODEC 210 is used to provide an interface between users on telephone extension lines 230 and signal processor 200. In the present embodiment, CODEC 210 digitizes analog messages and analog signals from users on telephone extension lines 230. CODEC 210 also converts digital signal from signal processor 200, processor 90, and the like, into analog signals for users on telephone extension lines 230. In the present embodiment, the analog signals include audio messages to and from users, dial tone and multifrequency (DTMF) tones, and the like. The analog signals also include voice prompts or phrases that provide voice prompting capability to users on telephone extension lines 230, messages recorded by users, and the like. Examples of voice prompts or phrases, include messages that instruct the user which keys on a telephone to select the perform particular functions, messages that tell the user how many messages are pending, requests for instructions, requests user input, and the like.

FIG. 3 also illustrates an interface 350 between signal processor 200 and packet portion 340. In this example, interface 350 includes interface logic 360 and 370, and physical/logical interface 365. In the present embodiment, physical/logical interface 365 follows the MVIP-90 compatible protocol, and interface logic 360 and 370 provides the appropriate signaling. In alternative embodiments of the present invention, alternative interfaces, such as specified by Dialogic, and the like may also be used.

In the present embodiment, packet portion 340 includes signal processor 380 and an input buffer 300 and an output buffer 320. Locations where input buffer 300 are written to are specified by a write pointer 260, and locations where input buffer 300 are read from are specified by a read pointer 270. Further, locations where output buffer 320 are written to are specified by a write pointer 280, and locations where output buffer 320 are read from are specified by a read pointer 290.

Signal processor 380 provides writer pointer 260, read pointer 270, write pointer 280, and read pointer 290, to input buffer 300 and output buffer 320, respectively. Further, signal processor 200 stores and retrieves data from these buffers, in response to the pointer, as will be described further below. In the present embodiment, input buffer 300 is typically a 80 byte wide×20 deep buffer, and output buffer 320 is typically a 40 byte wide×80 deep buffer. These buffers may be embodied as one or more dynamic random access memories (DRAM). The buffers are typically circular, so that locations can be reused. In alternative embodiments, different sized memories can also be used.

Signal processor 380 is typically a multi-process environment. Accordingly, in the present embodiment, eight network based telephone calls can be performed at the same time. To implement this capability, input buffer 300 and output buffer 320 are typically segmented, such that each network based telephone call supported, have use of a reserved portion of the respective buffers. For example, a first telephone call is allocated use of input buffer locations 0–1023, a second telephone call is allocated use of input buffer locations 1024–2023, and the like. Further, for each network based telephone call, separate read and write pointers for each buffer may be allocated and maintained. For example, an input buffer write pointer associated with the first call may point to location 1000, whereas an input buffer write pointer associated with a second call may point to location 2000, and the like.

In this embodiment, processor 90 is also used to send and receive packets of data across network 220. This embodiment includes two types of packets, packet that include control and status data, and packets that include voice data. Typically, the control data, is used to help set up communications between a server and a client. In this example, the control data may include the network call-back address of the caller.

In the present embodiment processor, 90 utilizes the Internet Protocol (IP) for enhancing packet transmission reliability over a packetized network. In a packet sending mode, processor 90 receives packets of TCP data from packet portion 340, and then divides the TCP packet into shorter packets of data. In the present embodiment, signal processor 380 provides the TCP packetizing of switching data and voice data. In this embodiment, processor 90 uses IP to format the TCP packets into TCP/IP packets and then sends the TCP/IP packets across network 220. According to TCP/IP protocol, processor 90 also monitors network 220 for ACK signals from the receiving telecommunications system. In alternative embodiments, processor 90 performs the TCP packetizing in addition in IP packetizing. In such embodiments, packet portion 340 delivers streams of digital data (such as switching data and voice data) to processor 90.

Processor 90 also receives TCP packets from packet sending telecommunications systems, and in response sends ACK signals back to the other systems. In the present embodiment, processor 90 strips IP headers from the packets and then forwards the received TCP packets to telecommunications server 70. More specifically, the TCP packets are sent to packet portion 340 for processing. In the present embodiment, processor 90 may utilize other network protocols in addition to or instead of IP, for example, UDP or the like. In the present embodiment, signal processor 380 receives the TCP packets and reassembles them into the right order. The switching and voice data recovered are then sent to signal processor 200 for further processing.

Signal processor 380 is embodied as a Texas Instruments TMS320C6201 digital signal processor (DSPs), and is coupled to receive instructions, data, and the like from processor 90, and/or signal processor 200. Of course DSPs from other manufacturers may be used in other embodiments of the present invention. In the present embodiment, memory 390 is used to store local instructions, data for signal processor 380, intermediate data, embodiments of the invention, and the like.

Figure 4A:
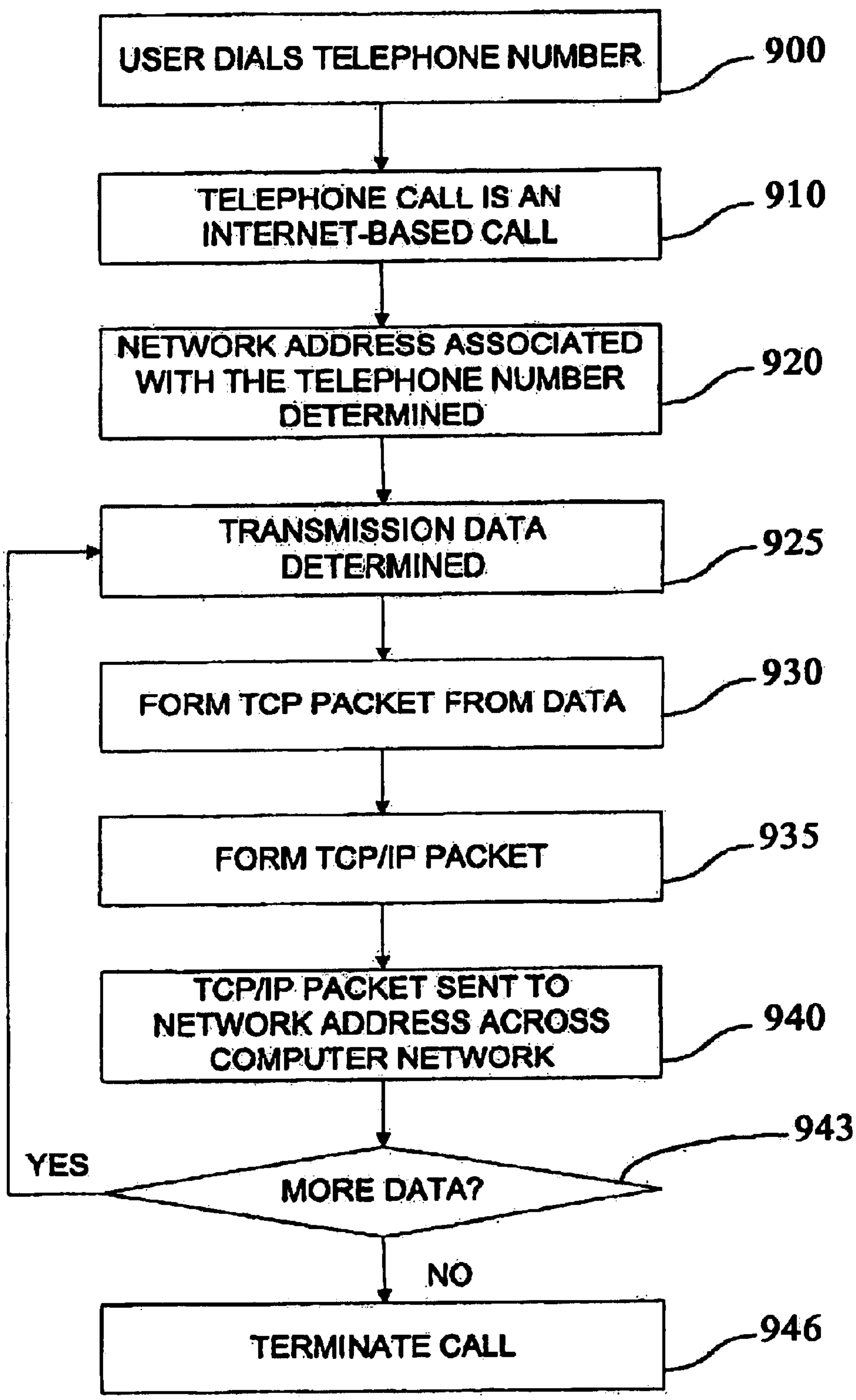
FIGS. 4A–4D illustrate flow diagrams of an embodiment of the present invention.
Figure 4B:
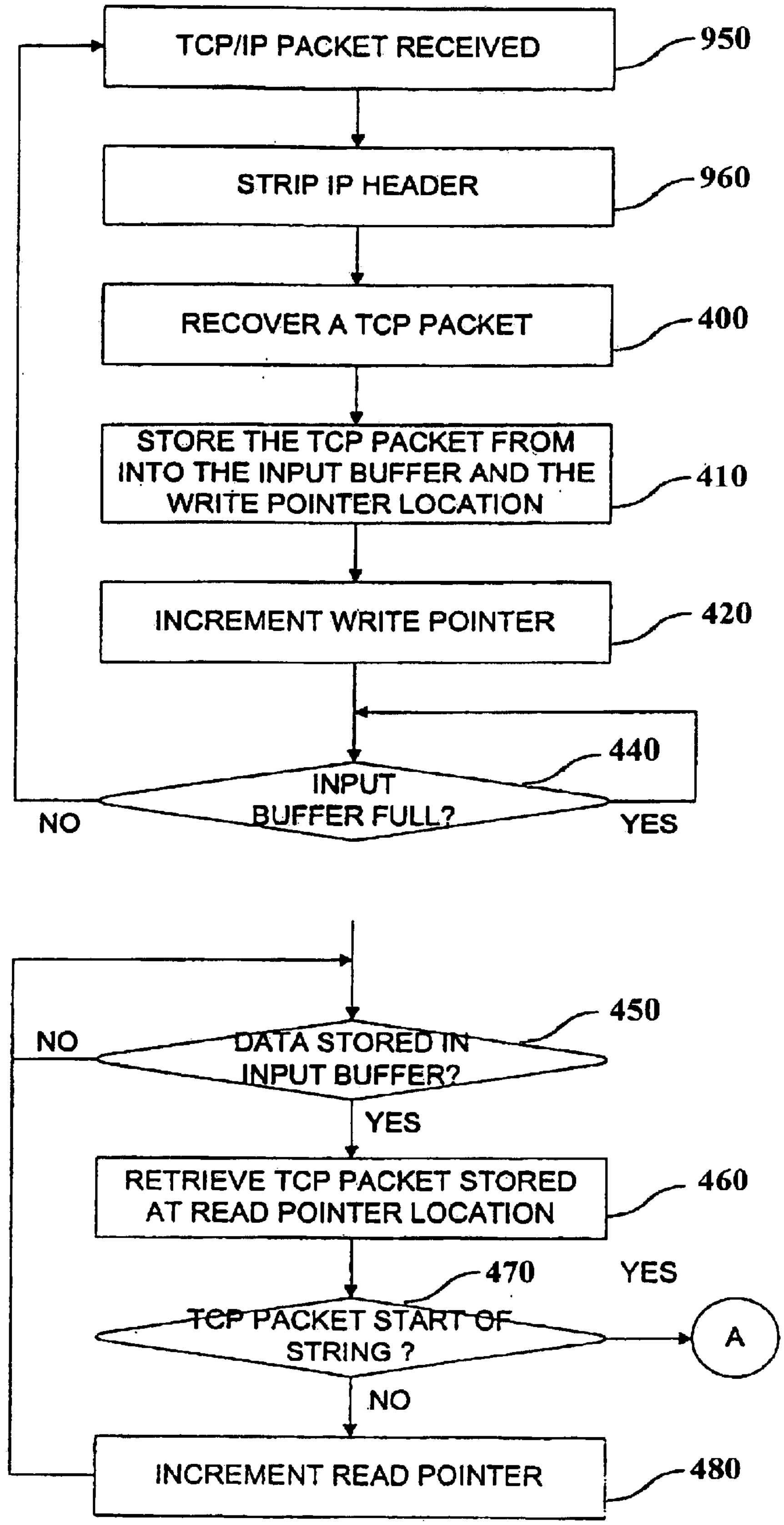
Figure 4C:
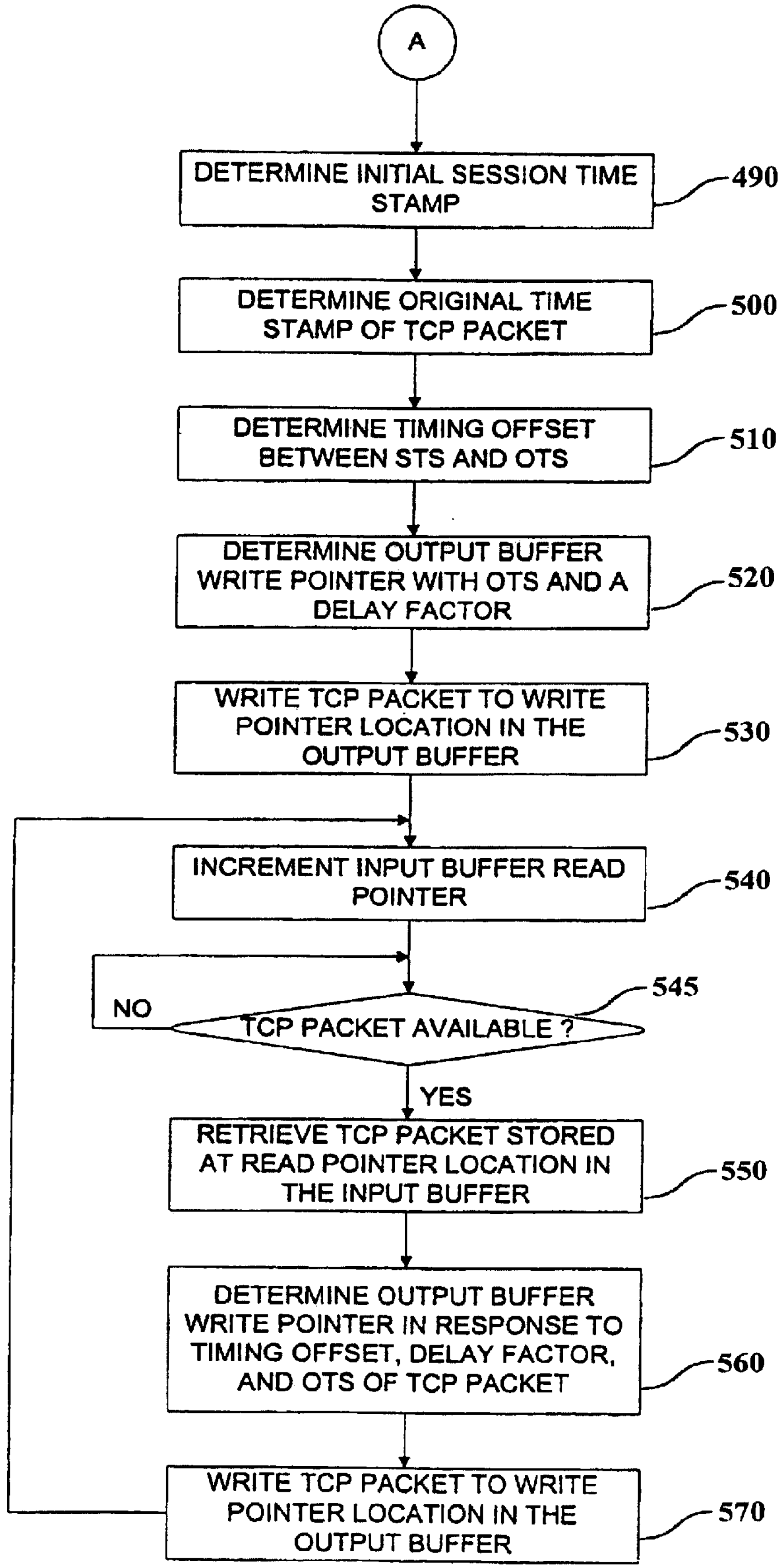
Figure 4D:
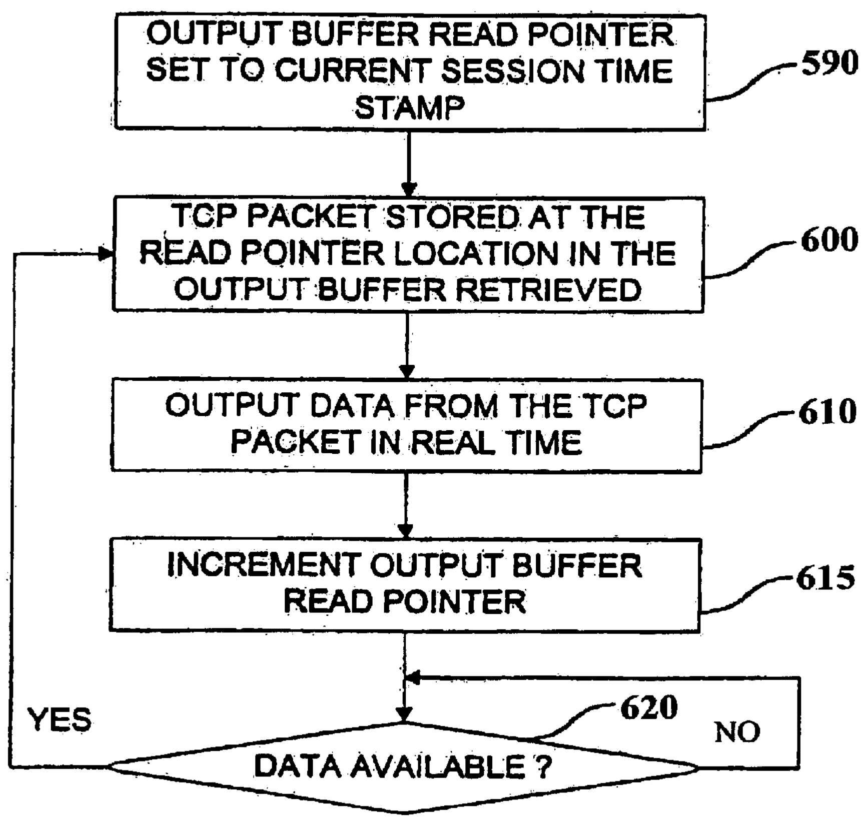

FIG. 4A illustrates a flowchart of an embodiment of the present invention.

Initially a user dials a number on their telephone, step 900. In the present embodiment, dialing is typically by way of the user pressing a series of DTMF keys on her telephone representing a particular telephone number. Alternatively, the user may press a series of keys providing speed dial-type capability, speak a name, a series of numbers, and the like. In another embodiment, dialing may occur by the user selecting a name, a telephone number, and the like from a list on a computer display associated with the user.

In response to the "dialed" number, within the caller's system, signal processor 200 or processor 90, determines that the telephone call should be completed across the computer network, step 910. In one embodiment, particular telephone calls are always made across the computer network. In alternative embodiments, the decision may be made depending upon time of day, long distance rates, computer network performance, and the like.

Next, the computer network address of the telecommunications system associated with the dialed number is determined, step 920. In the present embodiment, processor 90 receives the telephone number from signal processor 200. In particular, the computer network address preassociated with the telephone number is typically stored in memory storage 110 and retrieved by processor 90. In the present embodiment, the network address is an IP address. In alternative embodiment, the network address may be any number, characters, or words that represents a path to the receiving telecommunications system, for example, a domain name, a uniform resource locator (URL), or the like.

The data to be transmitted to the computer associated with the network address is then determined, step 925. One type of data is termed call set-up data. The call set-up data may include a telephone number, a connection request, a computer network address, voice data, caller identifying data such as the voice data, numeric data, ASCII data, caller telephone number, caller computer network address, DTMF tones, and the like. Another type of data may include voice data.

Processor 90 next generates groups or frames of data packets, step 930. In the present embodiment, these data packets are encoded using TCP. When each TCP packet is formed, processor 90 typically prepends a time stamp (original time stamp or OTS) indicating when the TCP packet was formed by processor 90. Typically, each TCP packet represents 10 milliseconds worth of data in the present embodiment. In the present embodiment, IP headers are typically added to each TCP packet, step 935.

Next, the TCP/IP packets that are formed are then sent across the computer network to the IP address specified, step 940. If no more data packets are to be transmitted, step 943, the call is terminated, step 946. Termination typically includes hanging up the telephone, or otherwise terminating the call. The TCP/IP packets are then received by the receiving telecommunications system, step 950. Next, the IP headers are typically stripped, step 960.

The more significant steps for the above packet transfer process have been described. However it should be understood that many steps, known to one of ordinary skill in the art have not been described, merely for sake of compactness in disclosure. For example, the intricacies of TCP acknowledgements (ACK), and the like are not described. Such steps may or may not be required when implementing alternative embodiments of the present invention.

After the IP headers are stripped, the frame of TCP packets is then obtained, step 400. In the present embodiment, the frame of TCP packets include a TCP packet having one or more bits set, indicating that the TCP packet is a start for the frame of TCP packets. Each TCP packet in the frame includes optional TCP data. More specifically, each packet includes a unique original time stamp (OTS) provided by the TCP encoding host computer.

Each of the TCP packets in the frame are subsequently stored into input buffer 300 within telecommunications server 70. In particular, a first TCP packet in the frame is stored at a location in input buffer 300 specified by an input buffer write pointer, step 410. The input buffer write pointer is the incremented, step 420. This process is repeated typically until input buffer 300 is full or when all the TCP packets in the frame are stored into input buffer 300, step 440.

As disclosed above, input buffer 300 is typically a circular buffer, thus TCP packets arriving later in time than earlier TCP packets may have a physical buffer address lower than or higher than the physical addresses of later TCP packets.

Concurrently with the above steps, signal processor 200 monitors input buffer 300 for storage of TCP packets into input buffer 300, step 450. In the present embodiment, signal processor 200 monitors the input buffer write pointer and the input buffer read pointer. Typically, the input buffer read pointer points to a location in input buffer 300 other than the location specified by the input buffer write pointer when TCP data is stored into input buffer 300. When all the TCP data has been read-out of input buffer 300, the input buffer read printer typically points to the same location as the input buffer write pointer. Other methods for indicating data are present and are contemplated in alternative embodiments of the present invention.

In the present embodiment, signal processor 200 then retrieves TCP packet stored in the location specified by the input buffer read pointer, step 460. Signal processor 200 determines whether the retrieved TCP packet indicates the start of the frame of TCP packets, step 470. If not, the input buffer read pointer is incremented, step 480, and the above steps may be repeated. As discussed above, in this embodiment, a TCP packet indicates the start of a frame of packets when one or more reserved bits have been set.

When signal processor 200 determines that the retrieved TCP packet is the starting packet, an initial session time stamp (STS) is first determined, step 490. This STS value is typically assigned the value of zero (0) merely for sake of convenience. In alternative embodiments, other initial STS values can be used. In the present embodiment, session time stamps (STS) values are used indices for output buffer 320, as will be described below.

In the present embodiment, output buffer 320 includes a plurality of locations. Input to a location in output buffer 320 is specified by an output buffer write pointer; and output from a location from output buffer 320 is specified by an output buffer read pointer. Locations of output buffer 320 are typically addressed by session time stamp (STS) values. As will be seen in the following example, in the present embodiment, the read pointers and write pointers are multiples of 80, to point to different locations in output buffer 320.

Next, signal processor 200 determines the original time stamp (OTS) associated with the starting TCP packet determined in step 470, above, step 500. As will be discussed further below, TCP packets may include a 32-bit time stamp given by the encoding TCP host machine. Based upon the OTS and the initial STS, a timing offset is determined, step 510. In the present embodiment, the timing offset=initial STS−OTS. However in alternative embodiments of the present invention, any combination of the two values can be used such as a linear combination. In such embodiments, the output buffer should be indexed appropriately, as explained further below.

A write pointer address location is then calculated in response to the initial STS and to a delay factor, step 520. In the present embodiment, the delay factor is typically on the order of 240. Since each location in output buffer 320 have addresses in multiples of 80, the delay factor translates to approximately three buffer locations. As will be illustrated below, this delay factor enables, embodiments of the present invention to account for TCP packets arriving "out of order", packet jitter, and the like. For example, TCP packets arriving before earlier sent TCP packets can be put in their correct OTS order.

In alternative embodiments of the present invention, the delay factor may easily be increased or decreased according to implementation and performance specific considerations. For example, while a large delay factor may increase the ability for embodiments to account for packet jitter, the larger delay factor typically translates to a caller discernable delay. In another embodiment, a delay factor need not be a constant and may be determined dynamically. Thus for example, in an embodiment where signal processor 200 determines that a great number of TCP packets are arriving out of order, the delay factor may be increased to increase the ability to play-back the data in the correct order. Further, in an embodiment where signal processor 200 determines that the TCP packets are arriving in order, the delay factor may be decreased, thus increasing user-perceived performance.

Next, signal processor 200 directs the copying of the starting TCP packet to the address location specified by the writer pointer address location, step 530. In one embodiment of the present invention, the entire starting TCP packet stored in input buffer 300 is copied to output buffer 320. In alternative embodiments of the present invention, the OTS and other TCP-related data may be stripped-off, and only the remaining data stored in output buffer 320. In still other embodiments, some TCP related data may be kept, and other data may be added to the remaining data before storage into output buffer 320.

After the starting TCP packet, or portions of the starting TCP packet have been saved into output buffer 320, the input buffer read pointer is incremented such that it points the next location in the input buffer 300, step 540. Next, it is determined whether another TCP packet is available in input buffer 300, step 545. If so, the TCP packet stored in the next location is retrieved, step 550. This TCP packet typically also includes an original time stamp (OTS) specified by the host computer encoding the TCP packet, as described above.

In the present invention, the OTS for the TCP packet is then added to the timing offset and the delay factor, to form an STS value for this TCP packet, step 560. The timing offset is typically the same timing offset determined above between the OTS of the TCP packet and the initial STS. Further the delay factor is also typically the same delay factor determined above.

The STS value for this TCP packet is then used by output buffer write pointer to specify the write location into output buffer 320. This TCP packet is then stored in the write location specified by the STS value for this TCP packet, step 570. As described above, in the present embodiment, this entire TCP packet need not be stored in output buffer 320. For example, portions of the TCP packet may stripped-off, such as the OTS.

In this example, it is noted that this TCP packet may actually be out of order, e.g. arrives before an earlier sent TCP packet. The present embodiment accounts for this packet jitter by using the OTS of the TCP packet to determine the appropriate STS value. As the example below will illustrate, the output-buffer write pointer may point to a location, other than an adjacent location of output buffer where the starting TCP packet was stored.

In the present embodiment, the above process is repeated typically until no more incoming TCP packets are available for reading from in input buffer 300. In the present embodiment, typically until no more TCP packets are available when signal processor 200 determines that the input buffer write pointer and the input buffer read pointer point to the same location in input buffer 300.

As data is stored into output buffer 320, signal processor 200 concurrently begins outputting the data, in this embodiment. More specifically, the output buffer read pointer is initially set to the current session time stamp, step 590. The data stored in this pointer location is then retrieved, step 600, and output in real time, step 610.

The output buffer read pointer is then set to the next location in output buffer 320, step 615. These steps repeat, typically until no more data is available for output from output buffer 320, step 620. Other embodiments and an example of the above embodiment is found in the above referenced patent application.

As was described above, and will be described further below, the data read from the output buffer may include switching (connection) data, may include voice data, and the like. For example, switching data may comprise a series of DTMF tones that represent telephone numbers, menu selections, letters, or the like. Further, voice data may comprise voice commands, pre-recorded messages, voice mail messages, conversation, and the like.

Figure 5:
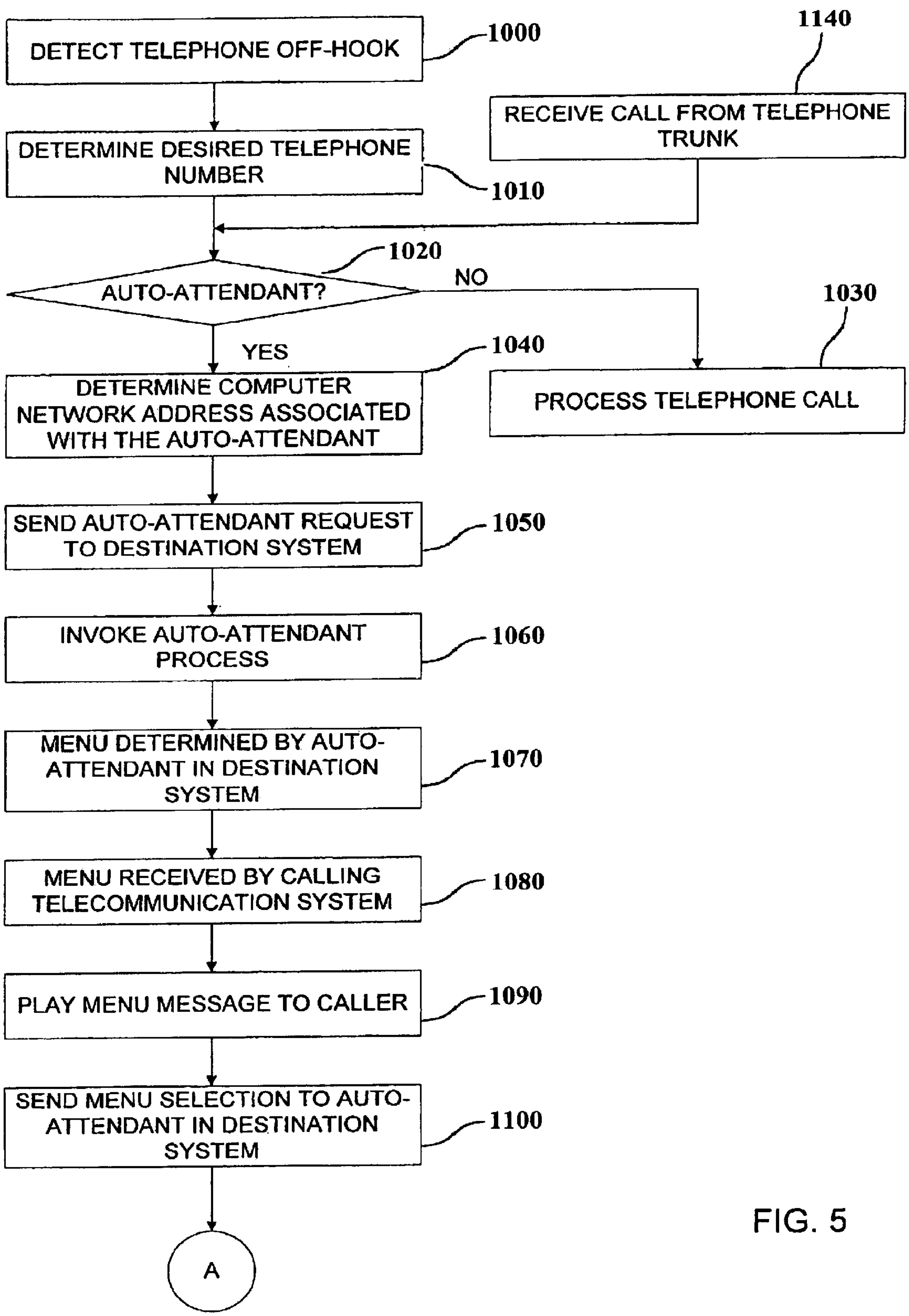
FIG. 5 illustrates a flow diagram according to an embodiment of the present invention.

FIG. 5 illustrates a flow diagram according to an embodiment of the present invention. In particular, FIG. 5 illustrates the process of making a telephone call to a packet-based network auto-attendant.

Initially, signal processor 200 determines that a telephone handset 240 coupled to a telephone extension line 230 goes off-hook, step 1000. Examples of the telephone going off-hook include, a caller picking up a handset, hitting a speakerphone button, or the like. Next, the user typically enters a telephone number, step 1010. In one embodiment, the caller enters the number by pressing a series of keys (numeric, *, and # keys) on the telephone keypad. In other embodiments, the caller may enter speed dial numbers, such as "*8", or the like; the caller may hit a button pre-programmed with the telephone number, or the like. In still other embodiments, the caller may speak one or more words into the handset. In response, using speech recognition techniques, signal processor 200 can determine the telephone number in response to the spoken word(s). For example, the caller may say "call operator" and in response, signal processor 200 determines that the caller wants to be connected to an auto-attendant process. In one embodiment of the present invention, without a live operator or attendant, to invoke the auto attendant process, the user may hit the "O" or Operator button on a telephone, or the like. In one embodiment, the call is then connected.

In response to the telephone number, signal processor 200 determines whether the call is to an auto-attendant process, step 1020. In the present embodiment, calls coming into a particular telephone line may automatically directed to an auto-attendant process. For example, instead of a live operator, calls coming into a particular telephone number of a company may be passed by default to the auto-attendant process. In an alternative embodiment, calls may be routed to the auto-attendant upon caller request. For example, a caller may not know an extension of another person, thus the caller may invoke the auto-attendant to obtain an extension directory, or the like. As another example, the caller may be connected to a voice mail server and want to exit and be connected with an auto-attendant so the caller can page someone, call another person, or the like.

In one embodiment of the present invention, whether a telephone number is automatically passed to an auto-attendant process may depend on the time of day. For example, during "regular" business hours, a live operator or attendant may answer a particular telephone number, for example a main number. However, after regular business hours, calls coming into the main number may be routed to the auto-attendant. In embodiments of the present invention, incoming telephone calls may be coupled to an auto-attendant process when the operator is busy, when incoming call volume is high, when other conditions occur, and the like.

In the case where the telephone call is not to be coupled to an auto-attendant process, signal processor 200 processes the telephone number, step 1030. Such calls may be directed to "physical" telephone numbers or "virtual" telephone numbers, as discussed in U.S. application Ser. No. 09/593, 732, filed Jun. 13, 2000, titled Computer Network-Based Telephone Switching Method and Apparatus.

In the present embodiment, it is contemplated that a centralized auto-attendant process is resident on a "destination" telecommunications system. That is, in this example, the telecommunication system receiving the incoming call is different from the "destination" telecommunications systems where an instance of the auto-attendant is available. For example, a company with multiple telecommunications system may set-up the architecture of their telephone switching system such that there is only one auto-attendant process. Such an auto-attendant has the benefit of centralized administration, uniformity in menu structures and selections, and the like.

In the case where the telephone call is for the auto-attendant, signal processor 200 determines a computer network address of a destination telecommunications system, step 1040. The computer network address is typically pre-programmed by a system administrator of the telecommunications system when setting up the system. In an alternative embodiments, only a domain name for the destination telecommunications system may be entered and a domain name server (DNS) is used to determine the appropriate numeric computer network address. In the present embodiment, the computer network address is typically an Internet Protocol (IP) address in the form "XXX.XXX.XXX.XX," although any other network address scheme may also be used.

In the present embodiment, the next step is to send switching data to the destination telecommunications system at the identified computer network address, step 1050. More particularly, using known IP protocols, packets of data are send to the IP address specified by the computer network address. In response, the destination telecommunications system receives the packets of data and acknowledges receipt of such packets by responding with an ACK signal, or the like.

Initially, the type of data transferred comprises switching data. In the current embodiment, switching data may include the telephone number the caller initially called. For example, the caller may have dialed into the "main" number of the system, may have dialed "O"perator, or the like. In such an example, the switching data may be the "main" number, or the like. In an alternative embodiment, the telecommunications system where the caller called into may translate the caller's request into a standardized auto-attendant number. For example, in this embodiment, regardless of how the caller requests the auto-attendant process from the system, the switching data sent by the sending system is the same. For example, the switching data may include a series of DTMF tones, such as ***,###, *81, "O"perator, or the like.

In embodiments of the present invention where there are multiple telecommunications system besides the system hosting the auto-attendant process, the switching data from the other systems may all be the same. For example, request from different telecommunications systems will all generate the same switching data, for example "O"perator, or the like.

In an alternative embodiment, multiple instances of an auto-attendant may reside upon the destination telecommunications system. In such an embodiment, auto-attendant requests from different systems may be routed to the appropriate instance of the auto-attendant on the destination system. In such an embodiment, it is envisioned that the switching data may be different for the calling telecommunications system so that the proper instance of the auto-attendant may be invoked. As an example, if a company has different telecommunications systems located in different countries, the company may want to provide different auto-attendant options, provide auto-attendant functionality in different languages for the different countries, or the like. In such a case, different instances of an auto-attendant would be an advantage.

In response to the switching data, the destination system involves an appropriate auto-attendant process, step 1060. In the present embodiment, an auto-attendant process is typically a software process implemented by processor 90 of the destination telecommunications system. In response to the switching data, an instance of the auto-attendant may be spawned.

In response to the auto-attendant request, the "top-level" auto-attendant menu options available to a caller are typically retrieved, step 1070. Some common top-level menu options include entering lower level menus, each having more specific functionality. For example, lower level menus may include menus directed to dial by name menus, dialing of extension menus, hearing a directory of individuals or workgroups, call-back options, and the like. Further details will be discussed in conjunction with FIG. 7, below. In alternative embodiments, sub-menus are not necessary and options available to the caller may be presented at the top-level, or the like.

The top-level menu options are then passed back to the caller's telecommunications server, step 1080. In the present embodiment, the menu is passed back as a voice message. For example, the message may be similar to the following: "Thank you for calling AltiGen Communications. Press 1 to dial by name. Press 2 for sales. Press 3 for an operator. Press 4 for a company directory. Press * and enter an extension, if you know the extension of the party you are calling."

In the present embodiment, the menu message is typically generated by the destination telecommunications system on the fly from a series of separate pre-recorded files that include voice recordings. These files are typically stored in memory storage 110 in the form of *.wav files or *.PCM files. In alternative embodiments of the present invention, text to speech algorithms may be used for on-the-fly conversion from text messages to the menu message.

In an alternative embodiment, the files with the voice data reside on the caller's telecommunication system. In such an embodiment, the destination system may send over file references to the caller's system. In response, the caller's system retrieves the appropriate voice files and plays the messages to the caller. In embodiments of the present invention, the voice files may reside on a network and may be accessible by utilizing directory services.

Next the menu message is played to the caller, step 1090, and in response, the caller may select a menu selection, step 1100. In the present embodiment, the menu message typically prompts the user to select an option via hitting a key on the caller's telephone, for example, *, #, 8, or the like. In response to such prompts, the caller may hit one or more keys on the telephone to advance to a sub-menu, or to directly execute an action (such as reach an operator). The caller input data (additional data) is then passed to the destination system as the caller's request. In an alternative embodiment, in response to the DTMF tone(s), the system may first convert the DTMF tone into an ASCII symbol(s), or the like. Then, the ASCII symbol(s) are then passed to the destination system.

In an alternative embodiment, the user is prompted to respond with oral commands. For example, the caller may be instructed to say "operator," if the caller wants to reach an operator; the caller may be instructed to say "directory,"

if the caller wants to hear a company directory; or the like. In response, the caller may speak a command. In one embodiment of the present invention, the caller's oral command is recognized by the original telecommunications system using conventional speech recognition techniques. In response, the system may convert the recognized speech to data such as an ASCII symbol(s), DTMF tone, or the like. This data (additional data) is then passed to the destination system as the caller's request. In an alternative embodiment, the caller's oral command is packetized and sent to the destination system. In response, the destination system may perform the speech recognition technique to determine the caller's request.

In embodiments of the present invention, combinations of the above techniques can be combined to provide the caller with multiple or alternative methods for making selections from menus, sub-menus, direct actions, or the like. For example, the caller may request to be transferred to an operator by hitting the "O"perator key or by saying "Operator." Other examples are easily envisioned in light of the above disclosure.

In an alternative embodiment of the present invention, the original telephone call need not be from a telephone extension 230, i.e. an internal telephone call. Instead, the telephone call may be from the telephone trunk, step 1140. In such an embodiment, steps 1000 and 1010 may not be performed, and processor 90 and/or signal processor 200 may simply receive a call from the trunk line for the auto-attendant.

Figure 7:
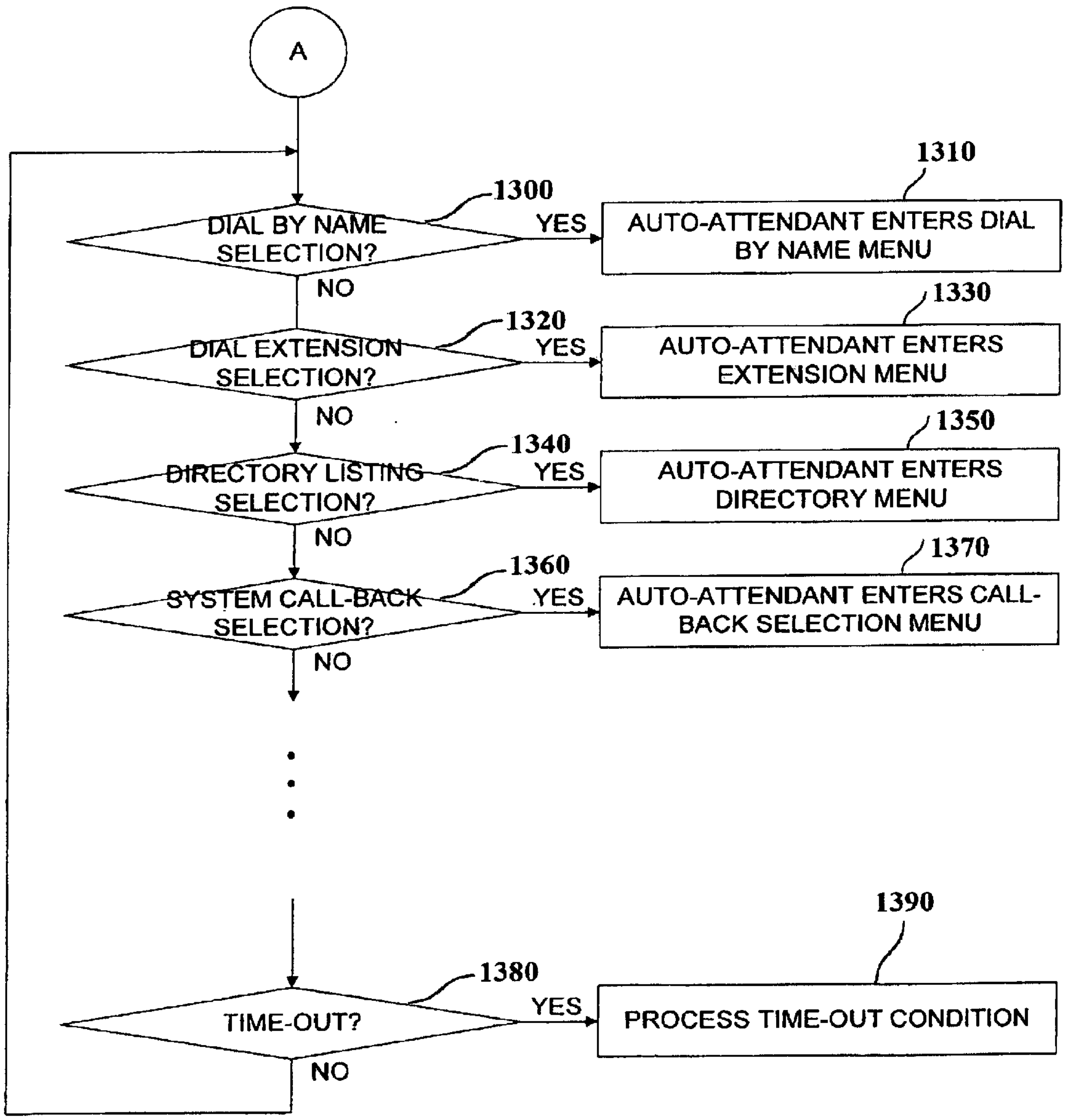
FIG. 7 illustrates a flow diagram according to an embodiment of the present invention.

In the present embodiment, processing may then continue as illustrated in FIG. 7.

Figure 6:
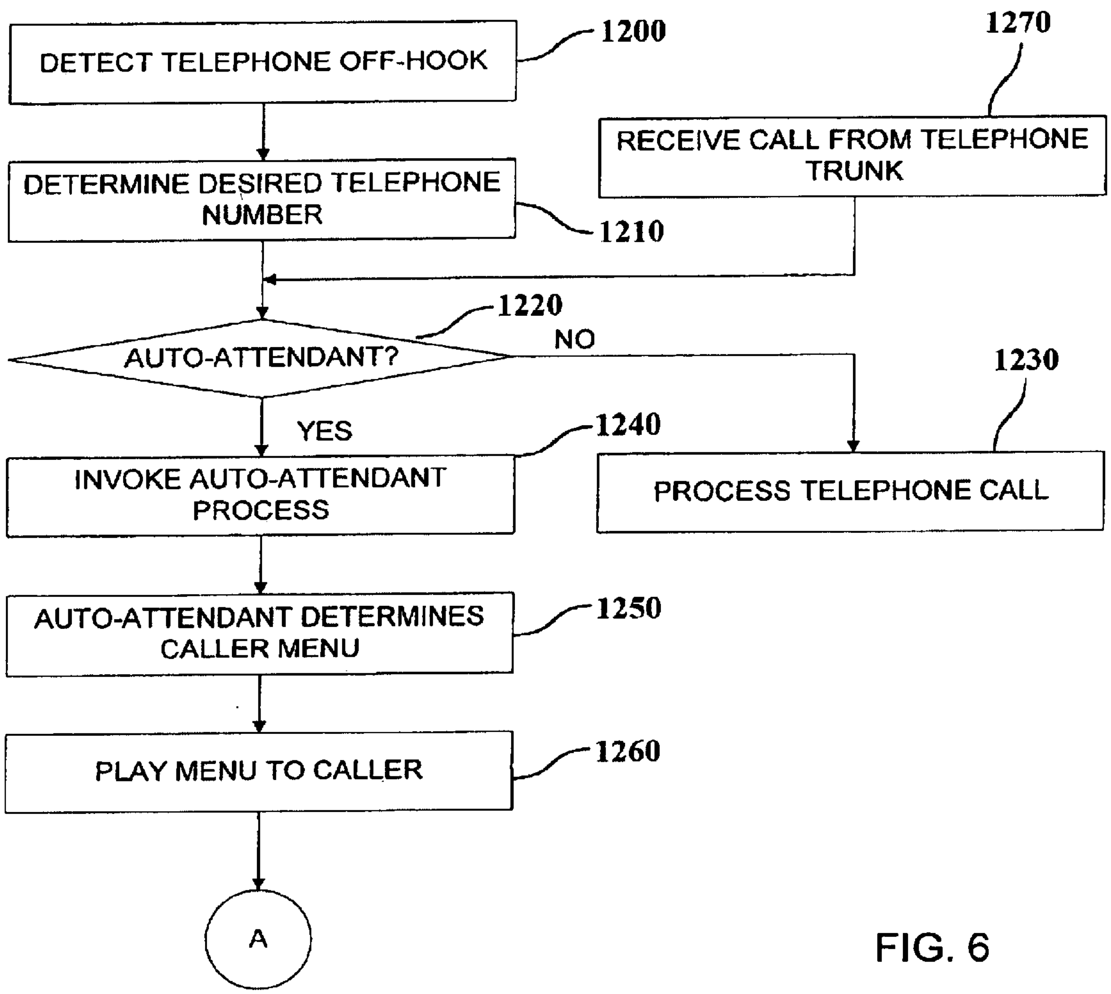
FIG. 6 illustrates another flow diagram according to an embodiment of the present invention.

FIG. 6 illustrates another flow diagram according to an embodiment of the present invention. In particular, FIG. 6 illustrates the process of making a telephone call to an auto-attendant on the same telecommunications system.

Initially, signal processor 200 determines that a telephone handset 240 coupled to a telephone extension line 230 goes off-hook, step 1200. Next, the person at the first telephone enters a new telephone number, step 1210. As described above in steps 1000 and 1010, the user may go off-hook and enter the telephone number in a variety of manners. For example, the person can hit a speakerphone key and then hit a speed dial key combinations, directly hit pre-programmed keys on the telephone, or the like.

In response to the telephone number, signal processor 200 determines whether the call is to an auto-attendant process, step 1220. In the present embodiment, calls coming into a particular telephone line may automatically or manually directed to an auto-attendant process, as described above. Further, routing to auto-attendant process may depend on the time of day, day of the week, call volume, or the like.

In the case where the telephone call is not to be coupled to an auto-attendant process, signal processor 200 processes the telephone number, step 1230. Such calls may be directed to "physical" telephone numbers or "virtual" telephone numbers, as discussed in U.S. application Ser. No. 09/593,732, filed Jun. 13, 2000, titled Computer Network-Based Telephone Switching Method and Apparatus, incorporated by reference for all purposes.

Next, an auto-attendant process is instantiated, step 1240. In the present embodiment, it is contemplated that an auto-attendant process is resident on the same telecommunications system as the one the caller calls in on. In one embodiment of the present invention, multiple instances of an auto-attendant may reside upon the telecommunications system. In such an embodiment, auto-attendant requests from different incoming telephone lines may be routed to the appropriate instance of the auto-attendant on the destination system. For example, incoming calls to the sales department may have an auto-attendant tailored for it, the administrative department may have an auto-attendant tailored for it, and the like.

In response to the auto-attendant request, the "top-level" auto-attendant menu options available to a caller are typically retrieved, step 1250. As described above, some common top-level menu options include entering lower level menus, each having more specific functionality. For example, lower level menus may include menus directed to dial by name menus, dialing of extension menus, hearing a directory of individuals or workgroups, call-back options, and the like. Further details will be discussed in conjunction with FIG. 7, below.

The top-level menu options and prompts are then played to the caller, setup 1260. In the present embodiment, the menu is played back as a voice message, as described above. Similarly, the menu message maybe generated on the fly from a series of separate pre-recorded files that include voice recordings, or from a text to speech process.

In response to such prompts, the caller may hit one or more keys on the telephone to advance to a sub-menu, or to directly execute an action (such as reach an operator). Alternatively, the user is prompted to respond with oral commands, as discussed above.

In embodiments of the present invention, combinations of the above techniques can be combined to provide the caller with multiple or alternative methods for making selections from menus, sub-menus, direct actions, or the like. For example, the caller may request to be transferred to an operator by hitting the "O"perator key or by saying "Operator." Other examples are easily envisioned in light of the above disclosure.

In an alternative embodiment of the present invention, the original telephone call need not be from a telephone extension 230, i.e. an internal telephone call. Instead, the telephone call may be from the telephone trunk, step 1270. In such an embodiment, steps 1200 and 1210 may not be performed, and processor 90 and/or signal processor 200 may simply receive a call from the trunk line for the auto-attendant.

In the present embodiment, processing may then continues as illustrated in FIG. 7.

FIG. 7 illustrates a flow diagram according to an embodiment of the present invention. As discussed above, a caller may be connected to an auto-attendant across the computer network, as illustrated in FIG. 5 or may be connected to an auto-attendant as illustrated in FIG. 6. In either of these cases, typically a menu of selections are presented to the caller, and in response the caller may make a menu selection.

In the present embodiment, one option available to a caller is entering a dial by name "menu," step 1300. In response to the selection, the auto attendant enters a dial-by-name menu/process, step 1310. In one embodiment of the present embodiment, the auto attendant gives the caller instructions on how to enter the name of the person by using DTMF tones, by speaking a person's name, or the like.

In an embodiment where the auto-attendant process is accessed across the computer network, the sending telecommunications system (the one the caller is coupled to) may simple send the DTMF tones and/or the spoken name to the destination system. In such an embodiment, the destination system will process the DTMF tones and/or recognize the spoken name, and in response, determine whether there is anyone, any department, or the like by that name and the like. In an alternative embodiment, the sending system may recognize the DTMF tones and convert them to ASCII characters, or the like; or use speech recognition techniques to recognize a name, or the like. In such an embodiment, the ASCII characters and/or the recognized name (also typically ASCII characters) are then sent to the destination system. such an embodiment may reduce the computer network traffic.

In another embodiment, the caller may dial by workgroup name, dial by geographic name, or the like. For example, the caller may enter a workgroup name such as: sales, marketing, administration, engineering, or the like to reach the appropriate workgroup or department. Further, the caller may enter a geographic name such as: Chicago, Boston, San Francisco, or the like to reach the appropriate office, factory, plant, or the like.

In the present embodiment, another option available to a caller is direct dialing of an extension, step 1320. In response to this selection, the auto attendant enters a extension dialing menu/process, step 1330. In one embodiment of the present embodiment, the auto attendant gives the caller instructions on how to enter the extension number (or any other telephone number) by pressing keys on the telephone, by speaking a telephone number, or the like.

In an embodiment where the auto-attendant process is accessed across the computer network, the sending telecommunications system (the one the caller is coupled to) may simply send the DTMF tones and/or the spoken telephone number to the destination system. In such an embodiment, the destination system will process the DTMF tones and/or recognize the spoken words to determine a number and then "call" that number. In a related embodiment, in response to the number, the destination system may "call" a different number. For example, the destination system may automatically transfer the call to the different number, or may map the number to an appropriate number.

In an alternative embodiment, the sending system may recognize the DTMF tones and convert them to numbers, or the like; or use speech recognition techniques to recognize the numbers, or the like. In such an embodiment, the numbers are then sent to the destination system. As above, the destination system may then "call" the number or transfer the call to an appropriate telephone number. Such an embodiment may advantageously reduce computer network traffic.

In the present embodiment, another option available to a caller is requesting a directly listing, step 1340. In response to this selection, the auto attendant enters a directory listing menu/process, step 1350. In one embodiment of the present embodiment, the auto attendant plays an audio message including a telephone directory and gives the caller instructions on how to respond, and the like. The audio message may be sent across the computer network when the auto attendant is located at a destination server. Alternatively, the auto-attendant may send a series of audio file references to the caller's telecommunication server. The file references may be file names located at the caller's telecommunications server; may be file names accessed via directory services, or the like. In embodiments of the present invention, directory services from Novel (Novell Directory Services) and/or Microsoft (Active Directory) may be used.

In embodiments of the present invention, the telephone directory provided to the caller may be a personnel directory; may be a workgroup directory (e.g. sales, marketing, or the like); may be a geographical directory (e.g. Midwest Office, Bay-Area Office, or the like); and the like.

In response to the directory listing, the caller may input data to the auto-attendant, using one of the techniques described above, or other input technique. The caller input may also be processed using one of the techniques described above, or the like. In embodiments of the present invention, the caller input may cause a telephone call to be initiated via telephone-trunk line, via an internal extension, via the computer network, or the like.

In an embodiment where the auto-attendant process is accessed across the computer network, the sending telecommunications system (the one the caller is coupled to) may simply send the DTMF tones and/or the spoken telephone number to the destination system. In such an embodiment, the destination system will process the DTMF tones and/or recognize the spoken words to determine the party desired and then "call" that party. In a related embodiment, in response to the party desired, the destination system calls may depend upon time of day. For example, the destination system may automatically transfer calls to an East Coast office after 5 pm EST to a West Coast office.

In an alternative embodiment, the sending system may recognize the DTMF tones and convert them to numbers, or the like; or use speech recognition techniques to recognize the numbers, or the like. In such an embodiment, the numbers are then sent to the destination system. As above, the destination system may then "call" the party or transfer the call to an appropriate telephone number.

In the present embodiment, another option available to a caller is invoking a call-back selection, step 1360. In response to this selection, the auto attendant enters a call-back menu/process step 1370. In one embodiment of the present embodiment, the auto attendant gives the caller instructions on how to enter a call-back request by pressing keys on the telephone, by speaking a telephone number, or the like.

In one embodiment of the present invention, a call-back request by a caller typically includes a caller identifier and/or a password, or the like. In response to the caller identifier and appropriate identifier, the auto-attendant will access a data file associated with the caller identifier. The data file typically includes a telephone number, or the like. In response, the auto-attendant will place a telephone call to the telephone number, thus "calling-back" the caller. In the present embodiment, the call back may be made via telephone trunk line, or via a computer network, as illustrated above.

In an embodiment where the auto-attendant process is accessed across the computer network, the sending telecommunications system (the one the caller is coupled to) may simply send the DTMF tones and/or the spoken telephone number to the destination system. In such an embodiment, the destination system will process the DTMF tones and/or recognize the spoken words to determine a number and then process that data.

In an alternative embodiment, the sending system may recognize the DTMF tones and convert them to numbers, or the like; or use speech recognition techniques to recognize the numbers, data, or the like. In such an embodiment, the numbers, data, or the like are then sent to the destination system. As described above, the destination system may then use the data to access a call-back data file, or the like.

Many other options and arrangement of menu options are imaginable in embodiments of the present invention based upon the present disclosure.

In another embodiment, the caller may be an IP telephone. In such an embodiment, after a call is initiated by the IP telephone, telephone server 70 receives call set-up data in the form of set-up IP packets across a computer network from the IP telephone.

In the present embodiment, if the auto-attendant does receive input from the caller within a predetermined period of time, step 1380, the auto-attendant may invoke a time-out process, step 1390. In one embodiment of the present invention, the auto-attendant "hangs-up" on the caller. The period of time is typically programmable by a system administrator. In other embodiments, different actions may occur, for example, transferring the call to a live attendant, via the computer network to another telecommunications system; repeating the menu selections, or the like.

In another embodiment of the present invention, the auto attendant is addressed via an IP address, i.e. any IP based telephone call to the IP address will be able to access the auto attendant. In this embodiment, IP based telephone calls may be from IP telephones, as discussed above, or IP based telephone calls from embodiments of the present invention, and the like. In other embodiments, the IP address may be a process on the host telecommunications system that receives the incoming telephone call. In such a case, instead of contacting a remote telecommunications system, the host telecommunications computer communicates to the auto attendant via the packetized (IP) network. Further, all telephone calls to an auto attendant may be converted to the IP protocol, and transferred to the IP-based auto attendant.

Embodiments of the present invention may be combined with other software packages. For example, AltiConsole and AltiReach software from AltiGen may be used to provide console support, work group access, configuration, and the like. Embodiments of the present invention may also be combined with third party programs to facilitate teleconferencing.

In different embodiments of the present invention, the general concepts described above may also be applied with regards to voice mail systems and to live attendants. In other words, callers calling into a telecommunications system may automatically be transferred across the computer network to a voice mail system or to a live attendant coupled to a destination telecommunications system. Similarly, a caller can call into a voice mail system and/or a live attendant at the telecommunications system. Further, the caller may be transferred by the voice mail system and/or the live attendant to a telephone coupled to a telecommunications system across the computer network. In the embodiments described above, the caller may or may not know that the call is being transferred across the computer network.

The block diagrams of the architecture and flow charts are grouped for ease of understanding. However it should be understood that combinations of blocks, additions of new blocks, re-arrangement of blocks, and the like are contemplated in alternative embodiments of the present.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for operating a telecommunications system comprises:

receiving, at a first telecommunications system, a telephone call from an external telephone line, wherein the first telecommunications system is coupled to a packetized network and connected to a telephone trunk line, wherein the telephone trunk line includes the external telephone line;

determining, at the first telecommunications system, that the telephone call will be transferred to an auto attendant process running on a second telecommunications system, wherein the second telecommunications system is remote from the first telecommunications system, wherein the second telecommunications system is coupled to the packetized network and connected to a telephone trunk line;

determining the computer network address of the second telecommunications system and switching data associated with the auto attendant process in response to the telephone call;

coupling the first telecommunications system with the second telecommunications system at the computer network address;

transmitting switching data associated with the auto attendant process from the first telecommunications system to the second telecommunications system via the packetized network and the Internet; and coupling the telephone call to the auto attendant process located at the second telecommunications system in response to the switching data associated with the auto attendant;

wherein the first telecommunications system does not provide auto attendant functionality in response to the telephone call.

2. The method of claim 1 further comprising:

receiving additional input from the external telephone line; and transmitting the additional data to the second telecommunications system;

wherein the additional data is processed by the auto attendant located at the second telecommunications system.

3. The method of claim 2 wherein the additional data comprises data selected from the group consisting of: DTMF tones, voice data.

4. The method of claim 2 further comprising:

receiving a plurality of auto attendant option data from the auto attendant process located at the second telecommunications system in the first telecommunications system in response to the additional data; and outputting audio messages to the external telephone line in response to the plurality of auto attendant option data.

5. The method of claim 4 wherein the audio messages comprise menu selection messages selected from the group consisting of dial by name menu selection, a directory menu selection, dial by extension menu selection, call-back selection.

6. The method of claim 5 further comprising receiving a menu selection from the external telephone line in response to the audio messages.

7. A telecommunications system operated according to the method of claim 1.

8. A method for operating a distributed telecommunications system comprises:

receiving a telephone call from an external telephone line into a first telecommunications system, wherein the first telecommunications system is coupled to a packet-based network and connected to a telephone trunk line, and wherein the telephone trunk line includes the external telephone lines;

determining a computer network address of a second telecommunications system and switching data in response to input data from the external telephone line, wherein the second telecommunications system is remote from the first telecommunications system, wherein the second telecommunications system is coupled to the packet-based network and connected to a telephone trunk line;

coupling the first telecommunications system with the second telecommunications system located at the computer network address via the packet-based network;

transmitting switching data from the first telecommunications system to the second telecommunications system;

coupling the telephone call to an auto attendant running on the second telecommunications system in response to the switching data;

receiving auto attendant menu data from the auto attendant on the second telecommunications system in the first telecommunications system via the packet-based network; and providing audio data to the external telephone line in response to the auto attendant menu data;

wherein the first telecommunications system lacks an auto attendant running thereon.

9. The method of claim 8 wherein the audio data comprises audio selected from the group consisting of: a directory of selectable options, a directory of selectable names, a menu of options.

10. The method of claim 9, further comprising receiving input data from the external telephone line in response to the audio data.

11. The method of claim 9, wherein the input data comprises data selected from the group consisting of: DTMF tone, voice data.

12. The method of claim 8, wherein the first telecommunications system includes a CODEC, and wherein the second telecommunications system includes a CODEC.

13. The method of claim 8 further comprising:

receiving another telephone call from an external telephone line into a third telecommunications system, wherein the third telecommunications system is coupled to the packet-based network and to a telephone trunk line, and wherein the telephone trunk line includes the external telephone line;

determining the computer network address of the second telecommunications system and switching data in response to input data from the external telephone line, wherein the second telecommunications system is remote from the third telecommunications system;

coupling the third telecommunications system with the second telecommunications system located at the computer network address via the packet-based network;

transmitting switching data from the third telecommunications system to the second telecommunications system;

coupling the other telephone call to the auto attendant running on the second telecommunications system in response to the switching data;

receiving additional auto attendant menu data from the auto attendant on the second telecommunications system to the third telecommunications system via the packet-based network; and providing audio data to the external telephone line in response to the additional auto attendant menu data;

wherein the third telecommunications system also lacks an auto attendant running thereon.

14. The method of claim 13 wherein the additional auto attendant menu data and the auto attendant menu data are different.

15. A method for operating a distributed telecommunications system comprises:

receiving a telephone call from a telephone extension coupled to a first telecommunications system;

selecting a routing identifier associated with a centralized auto attendant running upon a second telecommunications system;

determining a computer network address identifier of the second telecommunications system and connection data associated with the centralized auto attendant in response to the telephone call;

coupling the first telecommunications system with the second telecommunications system located at the computer network address;

transmitting connection data associated with the centralized auto attendant from the first telecommunications system to the second telecommunications system located at the computer network address via a computer network;

coupling the telephone call to the centralized auto attendant in response to the connection data associated with the centralized auto attendant;

transmitting data associated with menu options from the centralized auto attendant to the telephone extension; and transmitting a caller input in response to the data associated with menu options from the first telecommunications system to the centralized auto attendant, wherein the first telecommunications system is connected to telephone lines and coupled to a packet-based network;

wherein the second telecommunications system is connected to telephone lines and coupled to the packet-based network; and wherein the first telecommunications system does not include auto attendant functionality in response to the routing identifier.

16. The method of claim 15 further comprising:

receiving additional data from the telephone extension; and transmitting the additional data to the second telecommunications system located at the computer network address;

wherein the additional data is processed by an auto attendant located at the second telecommunications system and not by an auto attendant on the first telecommunications system.

17. The method of claim 16 wherein, the first telecommunications system does not have an auto attendant running thereon.

18. The method of claim 17 wherein the centralized auto attendant is a process running on the second telecommunications system.

* * * * *